(12) United States Patent
Xu (10) Patent No.: US 11,743,857 B2
(45) Date of Patent: Aug. 29, 2023

(54) METHOD AND SYSTEM OF WIRELESS DEVICE LOCATION SERVICE

(71) Applicant: Micron Electronics LLC, Boca Raton, FL (US)

(72) Inventor: Jun Xu, Boca Raton, FL (US)

(73) Assignee: MICRON ELECTRONICS LLC, Boca Raton, FL (US)

(*) Notice: Subject to any disclaimer, the term of this patent is extended or adjusted under 35 U.S.C. 154(b) by 150 days.

(21) Appl. No.: 17/341,986

(22) Filed: Jun. 8, 2021

(65) Prior Publication Data

US 2021/0385783 A1 Dec. 9, 2021

Related U.S. Application Data

(60) Provisional application No. 63/035,922, filed on Jun. 8, 2020.

(51) Int. Cl.
| | |
|---|---|
| *H04W 64/00* | (2009.01) |
| *H04W 76/11* | (2018.01) |
| *H04W 4/70* | (2018.01) |
| *H04W 80/02* | (2009.01) |
| *H04W 84/12* | (2009.01) |

(52) U.S. Cl.
CPC ........ *H04W 64/003* (2013.01); *H04W 4/70* (2018.02); *H04W 76/11* (2018.02); *H04W 80/02* (2013.01); *H04W 84/12* (2013.01)

(58) Field of Classification Search
CPC ...... G01S 11/06; G01S 5/0036; G01S 5/0242; G01S 5/14; H04W 4/02; H04W 4/70; H04W 64/003; H04W 76/11; H04W 80/02; H04W 84/12
See application file for complete search history.

(56) References Cited

U.S. PATENT DOCUMENTS

| | | | | |
|---|---|---|---|---|
| 2015/0223016 | A1* | 8/2015 | Webb | H04W 4/029 455/456.1 |
| 2016/0295360 | A1* | 10/2016 | Jones | G01S 5/021 |
| 2018/0132167 | A1* | 5/2018 | Zhang | H04W 48/17 |
| 2021/0176726 | A1* | 6/2021 | Vyunova | H04W 64/00 |

* cited by examiner

*Primary Examiner* — Charles N Appiah
*Assistant Examiner* — Nicole M Louis-Fils
(74) *Attorney, Agent, or Firm* — Anova Law Group, PLLC (57) ABSTRACT

A location service method for a wireless device includes: detecting one or more wireless access points; obtaining identification information and distance information of each of the one or more wireless access points; sending a location service request including the obtained identification information and the obtained distance information of each of the one or more wireless access points to a location service server; and receiving at least location information of the wireless device from the location service server.

19 Claims, 4 Drawing Sheets

METHOD AND SYSTEM OF WIRELESS DEVICE LOCATION SERVICE

CROSS-REFERENCE TO RELATED APPLICATION

This application claims the priority of U.S. Provisional Patent Application No. 63/035,922, filed on Jun. 8, 2020, the entire content of which is incorporated herein by reference.

FIELD OF THE INVENTION

The present invention generally relates to wireless communication technologies and, more particularly, to a method and system of a wireless device location service.

BACKGROUND

In a modern society, wireless communication has already become a part of people's lives. People are expecting a ubiquitous availability of wireless communication in our environment and at the same time, people are expecting to know locations of their wireless devices. Many wireless devices have a GPS-based location function. However, many other wireless devices do not have the GPS-based location function. Instead, the wireless devices without the GPS-based location function rely on their approximation to widely available wireless access points (e.g., Wi-Fi access points) to determine their locations. A wireless device location service is provided by the method and system consistent with the embodiments of the present disclosure.

The disclosed methods and systems are directed to solve one or more problems set forth above and other problems.

BRIEF SUMMARY OF THE DISCLOSURE

One aspect of the present disclosure provides a location service method for a wireless device. The method includes: detecting one or more wireless access points; obtaining identification information and distance information of each of the one or more wireless access points; sending a location service request including the obtained identification information and the obtained distance information of each of the one or more wireless access points to a location service server; and receiving at least location information of the wireless device from the location service server.

Another aspect of the present disclosure provides a location service method for a location service server. The method includes: receiving a location service request from a wireless device, the location service request including identification information and distance information of each of one or more wireless access points near the wireless device; searching a location service database to determine location information of each of the one or more wireless access points based on the identification information of each of the one or more wireless access points, the location service database including identification information of a plurality of wireless access points and corresponding location information of each of the plurality of wireless access points; performing a location algorithm to determine location information of the wireless device based on the location information and the distance information of each of the one or more wireless access points; and sending at least the location information of the wireless device to the wireless device.

Another aspect of the present disclosure provides a location service system. The system includes: a location service server storing a location service database, the location service database including identification information of a plurality of wireless access points and corresponding location information of each of the plurality of wireless access points; the plurality of wireless access points; and a wireless device, wherein the wireless device is configured to: detect one or more wireless access points; obtain identification information and distance information of each of the one or more wireless access points; send a location service request including the obtained identification information and the obtained distance information of each of the one or more wireless access points to a location service server; and receive at least location information of the wireless device from the location service server.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
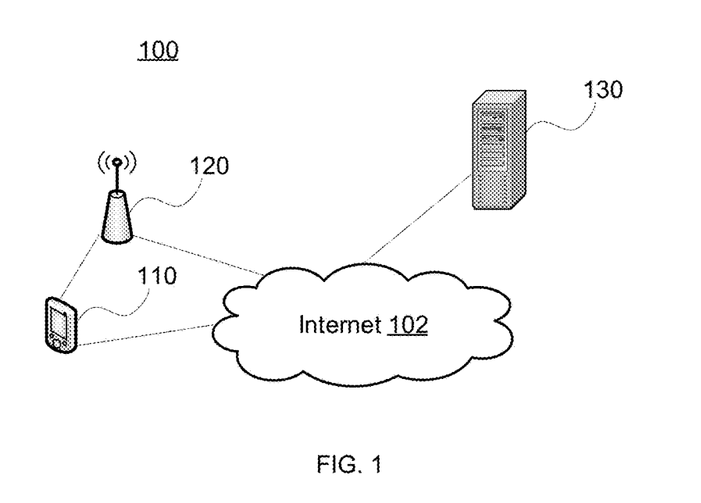
FIG. 1 illustrates an exemplary wireless device location service system consistent with the disclosed embodiments.

FIG. 1 illustrates an exemplary wireless device location service system consistent with the disclosed embodiments. As shown in FIG. 1, the wireless device location service system 100 may include the Internet 102, a wireless device 110, a wireless access point 120, and a location service server 130. Other components may be added and certain components may be removed without departing from the principles of the disclosed embodiments.

The Internet 102 may include any private and public computer networks interconnected using the standard transport control protocol/internet protocol (TCP/IP). Internet 102 may carry a large number of services over IP, such as the inter-linked hypertext documents of the World Wide Web (WWW) and electronic mail (or email). Internet 102 may connect a large number of websites. Further, Internet 102 may also carry voice-over IP (VOIP) services to enable voice or the like communications over Internet 102.

The wireless device 110 may include any appropriate communication device wirelessly communicating with the wireless access point 120. For example, the wireless device 110 may include a phone, a smart phone, a computer, a cell/mobile phone, a PDA, a tablet, or any customized communication devices, etc. Although one wireless device 110 is shown in FIG. 1, any number and types of wireless devices may be included.

The wireless access point 120 may include any appropriate wireless access point for communicating with the wireless device 110 directly through wireless channels. The wireless device 110 may communicate with the location service server 130 through the wireless access point 120. Although one wireless access point 120 is included, any number of wireless access points 120 may be included.

The location service server 130 may include one or more appropriate computer servers configured to provide a wireless device location service to the wireless device 110 through the Internet 102. Although one location service server 130 is included, any number of location service servers 130 may be included.

The wireless device 110 may communicate with the wireless access point 120 wirelessly over the various networks. For example, wireless device 110 may use any available cellular wireless standards, such as, GSM, GPRS, CDMA, WCDMA, 3G, 4G, LTE, and 5G, etc., 2-way radio, point-to-point, satellite, WIFI, and any other appropriate wireless communication protocols to communicate with the wireless access point 120.

In a normal operation, the location service server 130 may maintain a database to store location information about a plurality of wireless access points 120. The location information about the plurality of wireless access points 120 may be obtained in various ways. For example, the location information about the plurality of wireless access points 120 may be manually entered through a registration procedure at the time of installation. In another example, the location information about the wireless access point 120 may be determined based on location information of the wireless device 110 capable of determining its own location information via a satellite positioning system such as GPS and distance information of the wireless device 110 associated with the wireless access point 120. In another example, the location information about the wireless access point 120 may be determined based on the location information of other wireless access points 120 that are concurrently associated with the same wireless device 110 and the distance information of the wireless device 110 associated with all the wireless access points 120.

The location service server 130 includes a location service database for storing identification information of the wireless access point 120 and the location information of the wireless access point 120. The location service server 130 may constantly update the location service database when any wireless access point 120 is added, moved, or removed. The wireless device 110 sends the identification information of the wireless access point 120 associated with the wireless device 110 and the distance information between the wireless device 110 and the associated wireless access point 120 to the location service server 130. The location service server 130 determines the location information of the wireless device 110 based on the location information of the associated wireless access point 120 and the distance information between the wireless device 110 and the associated wireless access point 120, and sends the location information of the wireless device 110 to the wireless device 110, thereby providing the location service to the wireless device 110.

Figure 2:
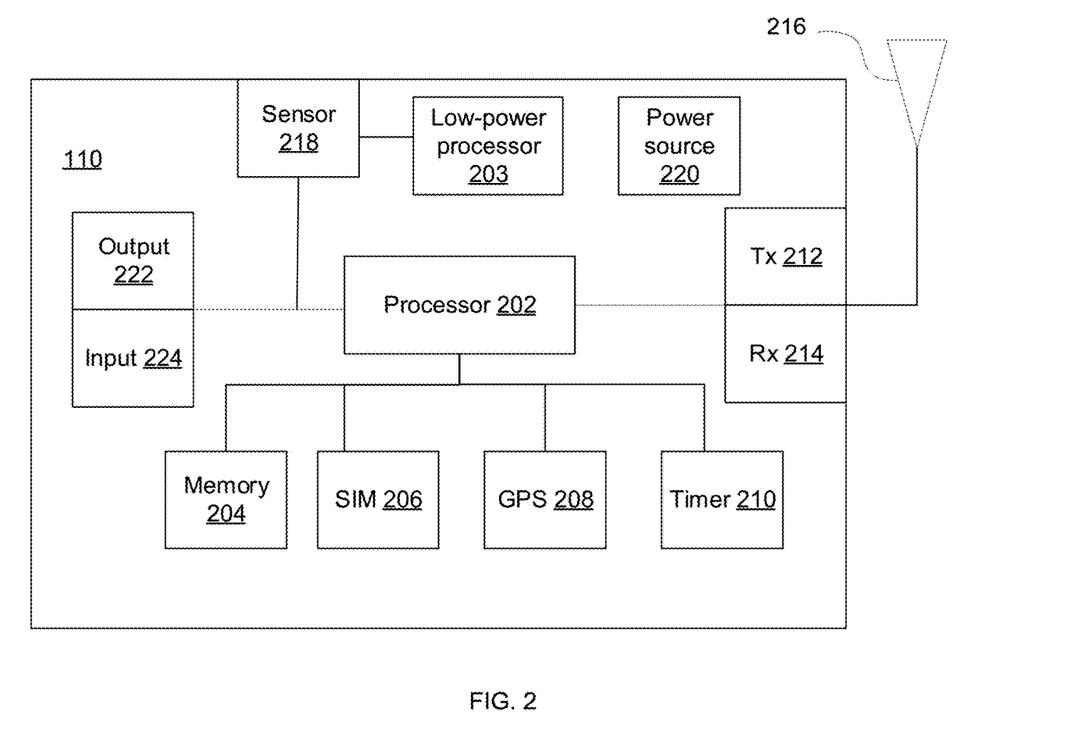
FIG. 2 illustrates a block diagram of an exemplary wireless device consistent with the disclosed embodiments.

FIG. 2 illustrates a block diagram of an exemplary wireless device 110 consistent with the disclosed embodiments. As shown in FIG. 2, the wireless device 110 may include a processor 202, a low-power processor 203, a memory 204, a subscriber identification module (SIM) 206, a global positioning system (GPS) unit 208, a timer 210, a transmitter 212, a receiver 214, an antenna 216, a sensor 218, a power source 220, an output 222, and an input 224. Certain components may be omitted, and other components may be added.

The processor 202 may include any appropriate type of graphic processing unit (GPU), general-purpose microprocessor, digital signal processor (DSP) or microcontroller, and application specific integrated circuit (ASIC), etc. The processor 202 may also include a communication processor, such as a base-band processor for wireless communication, etc.

The processor 202 may execute sequences of computer program instructions to perform various processes associated with wireless device 110. The computer program instructions may be stored and/or loaded in the memory 204 for execution by the processor 202.

The memory 204 may include any appropriate memory units, such as random-access memory (RAM), read-only memory (ROM), flash memory, or any other type of memory or storage. The memory 204 may include a non-volatile memory (e.g., flash memory) for storing data as well as program execution states to preserve such information when power is not available. The non-volatile and other volatile memory may also be used for executing computer programs and storing run-time data, etc.

The SIM 206 may include any appropriate subscriber identification card to authenticate the wireless device 110 and for accessing the wireless networks corresponding to the SIM 206. Although the SIM 206 is used in FIG. 2, any type of identification device or identification method may be used.

The GPS 208 may include any appropriate GPS device for providing the location information about the wireless device 110. The timer 210 may provide various timer functions and associated logics for the wireless device 110.

Further, through the antenna 216, the transmitter 212 and the receiver 214 may provide wireless data communication transmission and receiving functions according to various wireless communication protocols. The sensor 218 may include any appropriate type of sensor for sensing one or more parameters such that a sensing signal may be provided to the processor 202 for further processing to determine a sensing parameter, or the sensing signal may be used directly to control certain logics of the wireless device 110.

The power source 220 may include any appropriate power source to provide electrical power to the processor 202, the memory 204, and other components of the wireless device 110. For example, the power source 220 may include AC power, DC power, solar power, and/or other power. In certain embodiments, the power source 220 may include one or more batteries, and the one or more batteries may be recharged using various types of external power sources. Further, the power source 220 may also include certain control logics for sending battery status to report to the processor 202 and/or to controlling/distributing battery output to the various components. A power-on switch (not shown) may be used to control the power to the various components of the wireless device 110, such as the processor 202, the SIM 206, the transmitter 212, and the receiver 214, etc.

The output 222 may be provided for a user of the wireless device 110 to receive information from the wireless device 110. For example, the output 222 may include any appropriate output device, such as a display, a speaker, or any other output device.

The input 224 may be provided for the user of the wireless device 110 to input information into the wireless device 110. For example, the input 224 may include any appropriate input device, such as a keyboard, a microphone, a touch screen, or any other input device. In certain embodiments, the input 224 may be a single button, which can be pressed by the user such that a communication can be sent to a pre-configured emergency handling entity or a pre-configured intended reporting entity.

Figure 3:
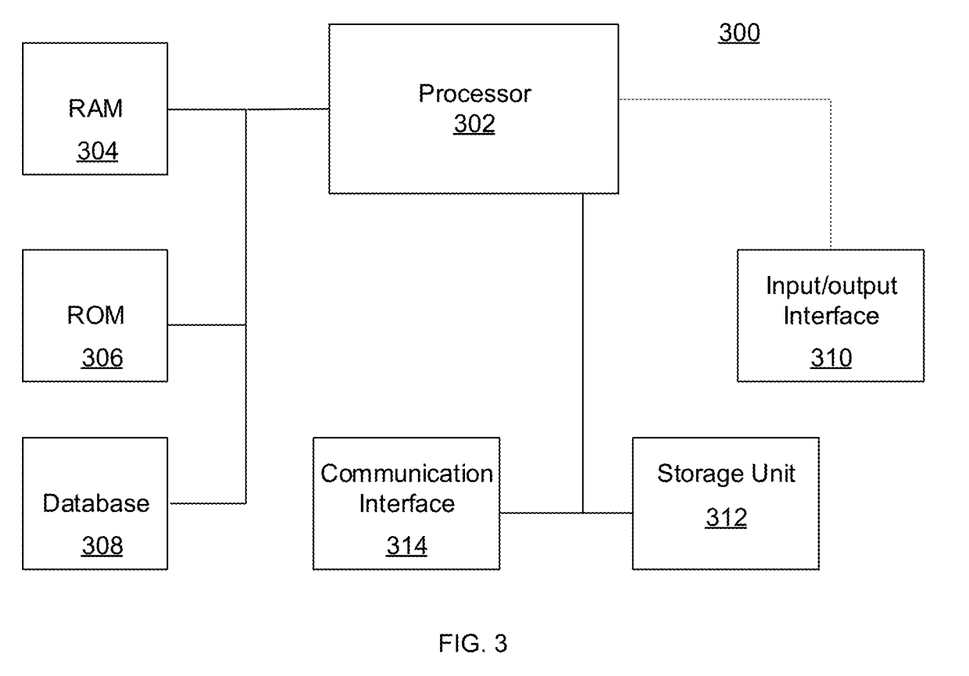
FIG. 3 illustrates a block diagram of an exemplary location service server consistent with the disclosed embodiments.

On the other hand, the location service server 130 may be implemented by any appropriate computing system. FIG. 3 illustrates a block diagram of an exemplary location service server consistent with the disclosed embodiments. The computing system 300 is used to implement the location service server 130.

As shown in FIG. 3, the computing system 300 may include a processor 302, a random-access memory (RAM) 304, a read-only memory (ROM) 306, a database 308, an input/output interface 310, a storage 312, and a communication interface 314. Other components may be added and certain devices may be removed without departing from the principles of the disclosed embodiments.

The processor 302 may include any appropriate type of graphic processing unit (GPU), general-purpose microprocessor, digital signal processor (DSP) or microcontroller, and application specific integrated circuit (ASIC), etc. The processor 302 may execute sequences of computer program instructions to perform various processes associated with computing system 300. The computer program instructions may be loaded into the RAM 304 for execution by the processor 302 from the ROM 306.

The database 308 may include any appropriate commercial or customized database to be used by the computing system 300, and may also include query tools and other management software for managing the database 308. Further, the input/output interface 310 may be provided for a user or users to input information into the computing system 300 or for the user or users to receive information from the computing system 300. For example, the input/output interface 310 may include any appropriate input device, such as a remote control, a keyboard, a mouse, a microphone, a video camera or web-cam, an electronic tablet, voice communication devices, or any other optical or wireless input devices. The input/output interface 310 may include any appropriate output device, such as a display, a speaker, or any other output devices.

The storage 312 may include any appropriate storage device to store information used by the computing system 300, such as a hard disk, a flash disk, an optical disk, a CR-ROM drive, a DVD or other type of mass storage media, or a network storage. Further, the communication interface 314 may provide communication connections such that the computing system 300 may be accessed remotely and/or communicate with other systems through computer networks or other communication networks via various communication protocols, such as TCP/IP, hyper text transfer protocol (HTTP), etc.

Figure 4:
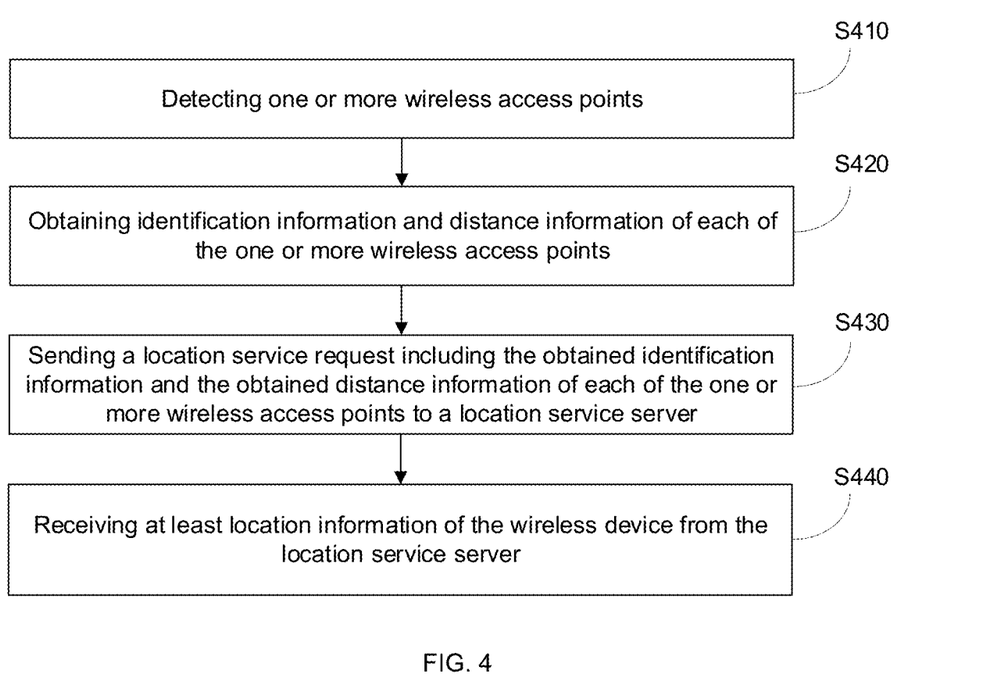
FIG. 4 illustrates a flowchart of an exemplary location service accessing method for a wireless device consistent with the disclosed embodiments.

FIG. 4 illustrates a flowchart of an exemplary location service accessing method for a wireless device consistent with the disclosed embodiments. As shown in FIG. 4, the location service accessing method includes the following processes.

At S410, one or more wireless access points are detected.

In one embodiment, the wireless device detects one or more wireless access points. The wireless device communicates with the one or more wireless access points using at least one of a Wi-Fi protocol or a Bluetooth protocol. The wireless access points are within a certain distance from the wireless device, such that the wireless device is able to receive wireless signals sent from the one or more wireless access points. The wireless device detects up to eight wireless access points that have the strongest wireless signals.

At S420, identification information and distance information of each of the one or more wireless access points are obtained.

In one embodiment, each of the one or more wireless access points is identified by the identification information. The identification information includes at least a media access control (MAC) address of a corresponding wireless access point. The distance information includes at least signal strength information of a wireless signal between the wireless device and a corresponding wireless access point.

In one embodiment, the signal strength of the wireless signal sent from the wireless device is measured by each of the one or more wireless access points. In another embodiment, the signal strength of the wireless signal sent from each of the one or more wireless access points is measured by the wireless device. For example, the signal strength for a Wi-Fi access point is called received signal strength indication (RSSI). Different wireless access points may be separated by different distances from the wireless device. Each of the one or more wireless access points is associated with a pair of the distance information and the identification information.

The distance information may also include other information. For example, the distance information may include one or more of fingerprint information, angle of arrival (AoA) information, and time of flight (ToF) information.

At S430, a location service request including the obtained identification information and the obtained distance information of each of the one or more wireless access points is sent to a location service server.

In one embodiment, after the wireless device obtains the identification information and the distance information of each of the one or more wireless access points, the wireless device sends a location service request including the identification information and the distance information of each of the one or more wireless access points to the location service server. The location service server is cloud-based. The wireless device communicates with the location service server through the internet. The wireless device may communicate with the location service server through the one or more wireless access points.

After receiving the location service request, the location service server searches the location service database including the identification information of a plurality of wireless access points to determine the location information of each of the one or more wireless access points. The location information includes at least physical location information. Based on the location information of the one or more wireless access points and the distance information of the one or more wireless access points to the wireless device, the location service server determines the location information of the wireless device.

At S440, at least location information of the wireless device is received from the location service server.

In one embodiment, after the location service server determines the location information of the wireless device, the location service server sends the location information of the wireless device to the wireless device. The wireless device receives the location information of the wireless device from the location service server.

The wireless device may receive additional information from the location service server. For example, the wireless device may also receive location information and technical information of the one or more wireless access points from the location service server.

In one embodiment, after the wireless device receives the location information of the wireless device, the wireless device displays the location information to a user of the wireless device. For example, the wireless device runs a location service application. The location information of the wireless device will be displayed at a user interface of the location service application.

In the embodiments of the present disclosure, the wireless device accesses the location service based on the identification information and the distance information of the one or more wireless access points. When the satellite-based location service is unavailable to the wireless device, the wireless device can still obtain the accurate location information of the wireless device.

Figure 5:
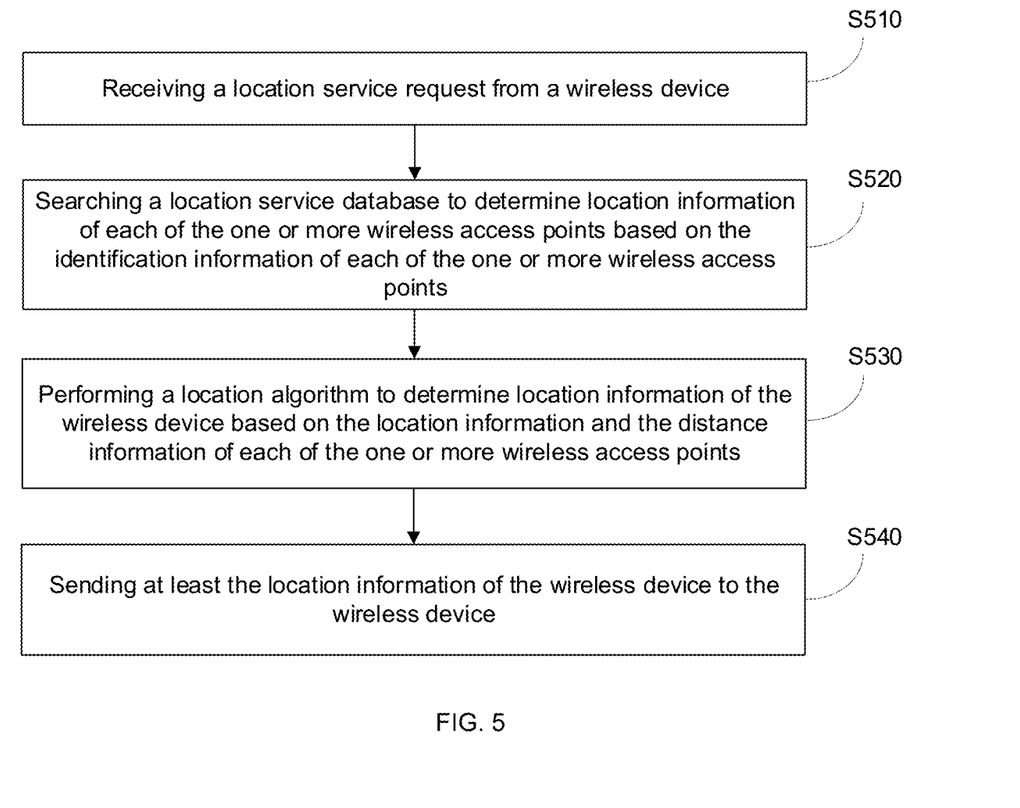
FIG. 5 illustrates a flowchart of an exemplary location service hosting method for a location service server consistent with the disclosed embodiments.

FIG. 5 illustrates a flowchart of an exemplary location service hosting method for a location service server consistent with the disclosed embodiments. The location service may be hosted by a cloud-based location service server. The location service server includes a location service database for storing location information of a plurality of wireless access points. Each of the plurality of wireless access points is identified by identification information. As shown in FIG. 5, the location service hosting method includes the following processes.

At S510, a location service request is received from a wireless device. The location service request includes identification information and distance information of each of one or more wireless access points near the wireless device.

Specifically, the wireless device detects the one or more wireless access points near the wireless device and obtains the identification information and the distance information of the one or more wireless access points that have strongest wireless signals. After the wireless device sends the location service request to the location service server, the location service server receives the location service request including the identification information and the distance information of each of the one or more wireless access points.

In one embodiment, the location service server updates the location service database based on the identification information and the distance information of the one or more wireless access points received from the wireless device. When no identification information of a corresponding wireless access point is stored in the location service database, the location service server performs a reverse location algorithm to determine the location information of the corresponding wireless access point based on the location information and the distance information of the one or more wireless access points excluding the unknown wireless access point. The reverse location algorithm is a reverse triangulation algorithm. After the location information of the corresponding wireless point is determined, the identification information and the location information of the corresponding wireless access point is stored in the location service database.

In another embodiment, the location service database may be updated by the location information sent by a corresponding wireless device capable of determining the location information of the corresponding wireless device without relying on the one or more wireless access points. For example, the wireless device may obtain the location information from the satellite location service such as GPS. In this case, the wireless device sends a location update request to the location service server. The location update request includes the location information of the wireless device, and the identification information and the distance information of each of the one or more wireless access points. After receiving the location update request, the location service server searches for the identification information of the one or more wireless access points. When the identification information of one of the one or more wireless access points is not stored in the location service database, the location service server performs the reverse location algorithm to determine the location information of the one of the one or more wireless access points that is not stored in the location service database based on the identification information and the distance information of the one or more wireless access points, and the location information of the wireless device. Then, the location service server updates the location service database with the identification information and the location information of the one of the one or more wireless access points.

At S520, the location service server searches a location service database to determine location information of each of the one or more wireless access points based on the identification information of each of the one or more wireless access points. The location service database includes identification information of a plurality of wireless access points and corresponding location information of each of the plurality of wireless access points.

Specifically, after the location service server receives the location service request, the location service server searches the location service database for the matching identification information to determine the location information of each of the one or more wireless access points.

In one embodiment, the location information is overlaid with a map to obtain additional information associated with the physical location information.

In one embodiment, the wireless device communicates with the one or more wireless access points using at least one of a Wi-Fi protocol or a Bluetooth protocol and the one or more wireless access points include up to eight wireless access points.

In one embodiment, the identification information includes at least a media access control (MAC) address of a corresponding wireless access point.

In one embodiment, the distance information includes at least signal strength information of a wireless signal between the wireless device and a corresponding wireless access point. The signal strength information between the wireless device and the corresponding wireless access point is converted into a physical distance between the wireless device and the corresponding wireless access point.

At S530, the location service server performs a location algorithm to determine location information of the wireless device based on the location information and the distance information of each of the one or more wireless access points.

Specifically, the location algorithm is a triangulation algorithm. The location service server performs the triangulation algorithm to determine the location information of the wireless device based on the location information and the distance information of each of the one or more wireless access points.

In one embodiment, the location information includes at least physical location information.

At S540, at least the location information of the wireless device is sent to the wireless device.

Specifically, after the location service server determines the location information of the wireless device, the location service server sends the location information of the wireless device to the wireless device.

In one embodiment, the location service server may send additional information to the wireless device. For example, the location service server may also send location information and technical information of the one or more wireless access points to the wireless device.

In the embodiments of the present disclosure, the location service server hosts the location service to be accessed by the wireless device. When the satellite-based location service is unavailable to the wireless device, the wireless device can still obtain the accurate location information of the wireless device based on the identification information and the distance information of the one or more wireless access points.

Other applications, advantages, alternations, modifications, or equivalents to the disclosed embodiments are obvious to those skilled in the art.

What is claimed is:

1. A location service method for a wireless device, comprising:
    detecting one or more wireless access points;
    obtaining identification information and distance information of each of the one or more wireless access points;
    sending a location service request including the obtained identification information and the obtained distance information of each of the one or more wireless access points to a location service server, wherein the location service server searches a location service database to determine location information of each of the one or more wireless access points, and in response to identification information of an unknown wireless access point being unknown in the location service database, the location service server performs a reverse location algorithm to determine the location information of the unknown wireless access point based on the location information and the distance information of each of the one or more wireless access points excluding the unknown wireless access point, and stores the identification information and the location information of the corresponding wireless access point; and
    receiving at least location information of the wireless device from the location service server.

2. The method according to claim 1, further comprising:
    displaying at least the location information at the wireless device.

3. The method according to claim 1, wherein:
    the wireless device communicates with the one or more wireless access points using at least one of a Wi-Fi protocol or a Bluetooth protocol.

4. The method according to claim 1, wherein:
    the identification information includes at least a media access control (MAC) address of a corresponding wireless access point.

5. The method according to claim 1, wherein:
    the distance information includes at least signal strength information of a wireless signal between the wireless device and a corresponding wireless access point.

6. The method according to claim 1, wherein:
    the location information includes at least physical location information.

7. The method according to claim 1, further comprising:
    sending a location update request to the location service server, wherein the location update request includes location information of the wireless device, and the identification information and the distance information of each of the one or more wireless access points.

8. The method according to claim 1, further comprising:
    receiving technical information of the one or more wireless access points from the location service server.

9. A location service method for a location service server, comprising:
    receiving a location service request from a wireless device, the location service request including identification information and distance information of each of one or more wireless access points detected by the wireless device;
    searching a location service database to determine location information of each of the one or more wireless access points;
    in response to the identification information of a corresponding wireless access point being unknown in the location service database, performing a reverse location algorithm to determine the location information of the corresponding wireless access point based on the location information and the distance information of each of the one or more wireless access points excluding the unknown wireless access point;
    storing the identification information and the location information of the corresponding wireless access point into the location service database; and
    sending at least the location information of the wireless device to the wireless device.

10. The method according to claim 9, further comprising:
    receiving a location update request, the location update request including the location information of the wireless device
    performing the reverse location algorithm to determine location information of a corresponding wireless access point that is included in the location update request but is not stored in the location service database; and
    storing the location information of the corresponding wireless access point into the location service database.

11. The method according to claim 9, wherein:
    the wireless device communicates with the one or more wireless access points using at least one of a Wi-Fi protocol or a Bluetooth protocol.

12. The method according to claim 9, wherein:
    the identification information includes at least a media access control (MAC) address of a corresponding wireless access point.

13. The method according to claim 9, wherein:
    the distance information includes at least signal strength information of a wireless signal between the wireless device and a corresponding wireless access point.

14. The method according to claim 13, further comprising:
    converting the signal strength information of the wireless signal between the wireless device and the corresponding wireless access point into a physical distance between the wireless device and the corresponding wireless access point.

15. The method according to claim 9, wherein:
    the location information includes at least physical location information.

16. The method according to claim 9, wherein:
    the reverse location algorithm is a reverse triangulation algorithm.

17. A location service system, comprising:
    a location service server storing a location service database;
    and
    a wireless device, wherein the wireless device is configured to:
        detect one or more wireless access points;
        obtain identification information and distance information of each of the one or more wireless access points;
        send a location service request including the obtained identification information and the obtained distance information of each of the one or more wireless access points to a location service server, wherein the location service server searches the location service database to determine location information of each of the one or more wireless access points, and in response to identification information of an unknown wireless access point being unknown in the location service database, the location service server performs a reverse location algorithm to determine the location information of the unknown wireless access point based on the location information and the distance information of each of the one or more wireless access points excluding the unknown wireless access point, and stores the identification information and the location information of the corresponding wireless access point; and receive at least location information of the wireless device from the location service server.

18. The system according to claim 17, wherein the reverse location algorithm is a reverse triangulation algorithm.

19. The system according to claim 17, wherein the distance information includes at least signal strength information of a wireless signal between the wireless device and a corresponding wireless access point.

* * * * *